(12) United States Patent
McCauley et al.

(10) Patent No.: US 8,138,248 B2
(45) Date of Patent: *Mar. 20, 2012

(54) METHOD TO IMPROVE COLD FLOW RESISTANCE OF POLYMERS

(75) Inventors: Kevin McCauley, Coventry Township, OH (US); Terrence E. Hogan, Akron, OH (US); Christopher G. Robertson, Marlborough, MA (US); Amy M. Randall, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 12/347,397

(22) Filed: Dec. 31, 2008

(65) Prior Publication Data

US 2010/0004361 A1    Jan. 7, 2010

Related U.S. Application Data

(60) Provisional application No. 61/017,913, filed on Dec. 31, 2007.

(51) Int. Cl.
*C08K 5/00* (2006.01)

(52) U.S. Cl. .......................... 524/108; 524/336; 524/387

(58) Field of Classification Search .................. 524/108, 524/336, 387
See application file for complete search history.

(56) References Cited

U.S. PATENT DOCUMENTS

| | | | |
|---|---|---|---|
| 4,301,026 A | 11/1981 | Kondo et al. | |
| 4,384,064 A | 5/1983 | Trotter et al. | |
| 4,429,140 A | 1/1984 | Murai et al. | |
| 4,906,706 A | 3/1990 | Hattori et al. | |
| 4,990,573 A | 2/1991 | Andreussi et al. | |
| 5,064,910 A | 11/1991 | Hattori et al. | |
| 5,106,999 A | 4/1992 | Gardlik et al. | |
| 5,268,439 A | 12/1993 | Hergenrother et al. | |
| 5,332,810 A | 7/1994 | Lawson et al. | |
| 5,567,784 A | 10/1996 | Wieder et al. | |
| 5,786,441 A | 7/1998 | Lawson et al. | |
| 5,844,050 A | 12/1998 | Fukahori et al. | |
| 6,025,450 A | 2/2000 | Lawson et al. | |
| 6,046,288 A | 4/2000 | Lawson et al. | |
| 6,080,835 A | 6/2000 | Lawson et al. | |
| 6,238,615 B1 | 5/2001 | Kobayashi et al. | |
| 6,248,312 B1 | 6/2001 | Franklin et al. | |
| 6,942,871 B2 | 9/2005 | Brüning et al. | |
| 6,977,281 B1 | 12/2005 | Ozawa et al. | |
| 6,992,147 B1 | 1/2006 | Ozawa et al. | |
| 7,094,820 B2 | 8/2006 | Zhao et al. | |
| 7,153,919 B2 | 12/2006 | Hogan et al. | |
| 7,199,202 B2 | 4/2007 | Minami et al. | |
| 7,294,680 B2 | 11/2007 | Sone et al. | |
| 7,335,715 B2 | 2/2008 | Iseki et al. | |
| 2002/0170642 A1* | 11/2002 | Westermann et al. | 152/209.5 |
| 2006/0004131 A1 | 1/2006 | Ozawa et al. | |
| 2006/0014903 A1* | 1/2006 | Vromman | 525/192 |
| 2006/0025539 A1 | 2/2006 | Ozawa et al. | |
| 2006/0030677 A1 | 2/2006 | Ozawa et al. | |
| 2006/0264589 A1 | 11/2006 | Yan | |
| 2006/0264590 A1 | 11/2006 | Hogan et al. | |
| 2006/0272760 A1 | 12/2006 | Teratani et al. | |
| 2007/0149717 A1 | 6/2007 | Luo et al. | |
| 2007/0249850 A1 | 10/2007 | Xie et al. | |
| 2007/0276122 A1 | 11/2007 | Luo | |
| 2007/0299256 A1 | 12/2007 | Xie | |
| 2008/0051552 A1 | 2/2008 | Luo et al. | |
| 2008/0146745 A1 | 6/2008 | Luo et al. | |

FOREIGN PATENT DOCUMENTS

| | | |
|---|---|---|
| DE | 3321713 A1 | 12/1984 |
| GB | 2077749 A | 12/1981 |
| JP | 48099244 A | 12/1973 |
| JP | 53091952 A | 8/1978 |
| JP | 56115701 A | 9/1981 |
| JP | 57055950 A | 4/1982 |
| JP | 63256635 A | 10/1988 |
| JP | 05-051406 A | 3/1993 |
| JP | 05-059103 A | 3/1993 |
| JP | 10-306113 A | 11/1998 |
| JP | 11-035633 A | 2/1999 |
| WO | WO 92/00301 A1 | 1/1992 |
| WO | WO 01/34658 A1 | 5/2001 |
| WO | WO 01/34659 A1 | 5/2001 |
| WO | 2006066395 A | 6/2006 |

OTHER PUBLICATIONS

European Search Report, Application No. EP 09 25 1929 dated Oct. 20, 2009.
European Search Report dated Mar. 23, 2009 for Application No. EP 08 25 4181.

* cited by examiner

*Primary Examiner* — Peter D Mulcahy
(74) *Attorney, Agent, or Firm* — Meredith E. Hooker; Arthur M. Reginelli

(57) ABSTRACT

A method for preparing a polymeric composition, the method comprising providing a polymer cement including a polymer and a solvent, introducing an acetal or ketal of an alditol with the polymer cement, and isolating at least a portion of the polymer and the acetal or ketal of an alditol from the solvent to provide a polymeric composition including the polymer and the acetal or ketal of an alditol.

50 Claims, 2 Drawing Sheets

Figure 1. Comparison of the Dynamic Viscosity (η) of SBR and SBR containing DBS at 1 and 3 wt % using Frequency Sweep at 2% strain and 25°C.
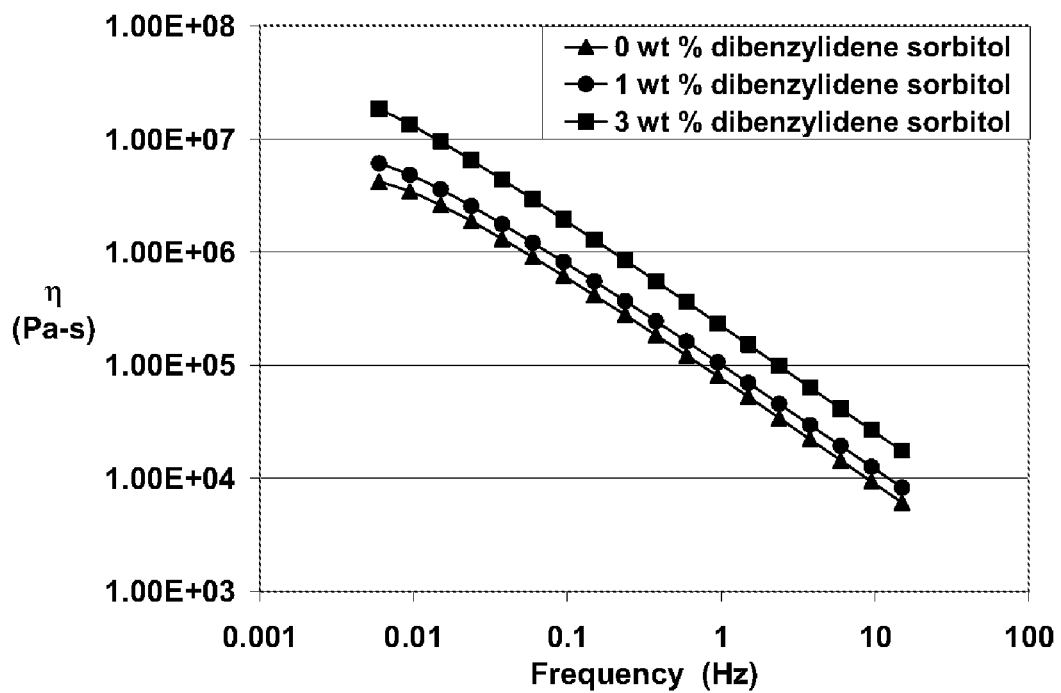

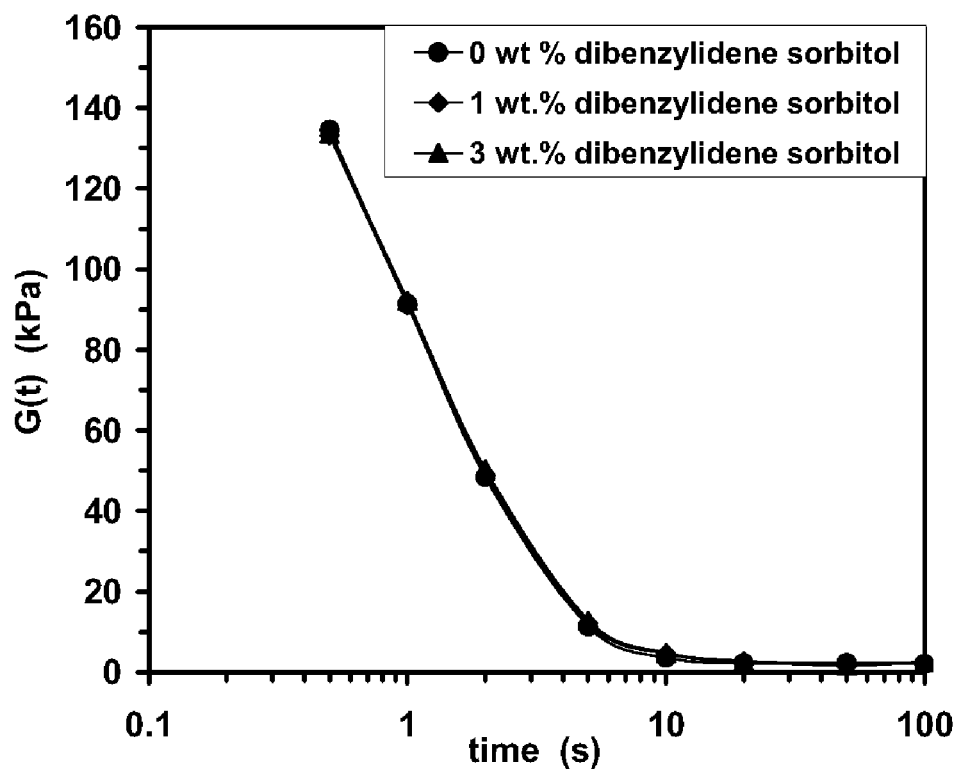
Figure 2. RPA Stress Relaxation Data (50°C at 100% strain) for Untreated SBR and 1 and 3 wt % DBS Treated SBR.

METHOD TO IMPROVE COLD FLOW RESISTANCE OF POLYMERS

PRIORITY CLAIM

This application claims the benefit of U.S. Provisional Application No. 61/017,913, filed Dec. 31, 2007, which is incorporated herein by reference.

FIELD OF THE INVENTION

One or more embodiments of the present invention relate to methods for improving the cold flow resistance of polymers by employing certain acetals and ketals of alditols.

BACKGROUND OF THE INVENTION

Certain polymers, such as polydiene elastomers, exhibit cold flow at standard conditions. In other words, the polymers flow under their own weight, which causes problems when attempting to transport or store the polymers. Therefore, it is desirable to prevent cold flow from occurring by improving cold flow resistance of the polymer.

One solution employed in the art includes coupling the polymers. For example, linear polydienes, such as those polydienes produced by anionic polymerization or coordination catalysis, have been coupled with compounds. Although coupling agents may serve to improve cold flow resistance, they do not always serve to provide desired tire properties.

Therefore, in the art of making tires, particularly tire treads, functionalized polymers are advantageously employed to improve properties such as hysteresis loss. These functionalized polymers are often prepared by terminating growing polymer chains with functionalizing agents that impart a functional group on the end of the polymer chain.

Unfortunately, the functionalizing agents employed to terminate the polymer and provide advantageous properties to the tire do not always serve to provide cold flow resistance to the polymer. Furthermore, coupling agents, which improve cold flow resistance, are often incompatible with functionalizing agents while reacting with the polymer chain. Therefore, it is not always possible to combine functionalizing agents and coupling agents to achieve both good cold flow resistance and desired tire properties.

Because there remains a need for functionalized polymers, and in fact there is a desire for functionalized polymers with a high degree of functionality, the use of coupling agents that compete with the functionalizing agent can be detrimental to this goal. A need therefore exists to improve cold flow resistance by means other than coupling reactions.

SUMMARY OF THE INVENTION

One or more embodiments of the present invention provide method for preparing a polymeric composition, the method comprising providing a polymer cement including a polymer and a solvent, introducing an acetal or ketal of an alditol with the polymer cement, and isolating at least a portion of the polymer and the acetal or ketal of an alditol from the solvent to provide a polymeric composition including the polymer and the acetal or ketal of an alditol.

Other embodiments provide method for preparing a polymeric composition, the method comprising providing a polymer cement and introducing dibenzylidene sorbitol to the polymer cement.

Still other embodiments provide polymeric composition comprising an elastomer and a sorbitol derivative.

DETAILED DESCRIPTION OF THE DRAWINGS

FIG. 1 is a comparison of the Dynamic Viscosity (η) of SBR and SBR containing DBS at 1 and 3 wt % using frequency sweep at 2% strain and 25° C.

FIG. 2 is a graph of RPA stress relaxation data (50° C. at 100% strain) for SBR and at 0, 1, and 3 wt % DBS treated SBR.

DETAILED DESCRIPTION OF ILLUSTRATIVE EMBODIMENTS

It has unexpectedly been discovered that acetals or ketals of alditols can be used to improve the cold flow characteristics of elastomers without deleteriously impacting the properties or use of the elastomers. In particular embodiments, these acetals or ketals of alditols have advantageously been found to be useful for improving the cold flow characteristics of functionalized elastomers. In one or more embodiments, the acetals or ketals of alditols have unexpectedly achieved an improvement in cold flow resistance of the polymers without deleteriously impacting the ability to mix or process the polymer. In other words, it has unexpectedly been found that the acetals or ketals of alditols, or their reaction or interaction product within the polymer, is temperature and/or shear dependent, which is highly advantageous for transport, storage, and compounding of certain polymers that exhibit low resistance to cold flow. Also, the polymeric compositions prepared from elastomeric compositions of one or more embodiments of this invention demonstrate similar cure characteristics, similar Mooney viscosities, and comparable dynamic properties to those compositions that are similarly prepared but do not include the acetals or ketals of alditols.

In one or more embodiments, acetals or ketals of alditols include mono, di-, and tri-acetals or ketals of alditols. In these or other embodiments, acetals or ketals of alditols include the reaction product of an alditol and an aldehyde, a ketone, or both an aldehyde and a ketone. These reactions are known in the art. For example, alditols and aldehydes can be reacted in the presence of an acid catalyst as described in U.S. Pat. Nos. 4,429,140 and 5,106,999, U.S. Publication Nos. 2007/0299256 and 2007/0249850, and International Application No. WO/1992/000301, all of which are incorporated herein by reference. And, for example, ketals of alditols can be prepared by reacting alditols with dimethoxy alkanes as taught in Smith, Michael B.; March, Jerry; *March's Advanced Organic Chemistry*, 5th Ed.; John Wiley & Sons, Inc: New York, 2001.

In one or more embodiments, alditols, which may also be referred to as substituted or unsubstituted alditols, include compounds defined by the formula:

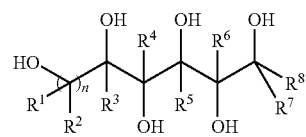

where $R^1$, $R^2$, $R^3$, $R^4$, $R^5$, $R^6$, $R^7$ and $R^8$ are each independently a hydrogen atom or monovalent organic group, and n is 0, 1, or 2.

In one or more embodiments, monovalent organic groups may include hydrocarbyl groups or substituted hydrocarbyl groups such as, but not limited to, alkyl, cycloalkyl, substituted cycloalkyl, alkenyl cycloalkenyl, substituted cycloalkenyl, aryl, allyl, substituted aryl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In particular embodiments, $R^2$, $R^3$, $R^4$, $R^5$, $R^6$ and $R^8$ are each independently a hydrogen atom or a monovalent organic group having 2 or less carbon atoms, and $R^1$ and $R^7$ are each independently a hydrogen atom or a monovalent organic group. In particular embodiments, $R^1$ and $R^7$ are each independently a hydrogen atom, an alkenyl group, an alkyl group, an alkoxy group, a hydroxyl alkyl group, or an alkyl-halide group.

Specific examples of alditols include, but are not limited to, sorbitol, xylitol, allyl-sorbitol, propyl-sorbitol, 1-methyl-2-propenyl sorbitol, allyl-xylitol, and propyl-xylitol.

In one or more embodiments, aldehydes include compounds represented by the formula $R^9$—C(O)H, where $R^9$ is a monovalent organic group. In particular embodiments, $R^9$ is an acyclic hydrocarbyl or substituted hydrocarbyl group having at least three carbon atoms, in other embodiments at least six carbon atoms, and in other embodiments at least nine carbon atoms up to 20 carbon atoms, where the term substituted refers to the replacement of one or more hydrogen atoms that are attached to a carbon atom with a monovalent organic group. In other embodiments, $R^9$ is a cyclic hydrocarbyl or substituted cyclic hydrocarbyl group including six carbon atoms, in other embodiments at least eight carbon atoms, and in other embodiments at least 10 carbon atoms in the ring. In certain embodiments, $R^9$ is a heterocyclic or substituted heterocyclic group. In yet other embodiments, $R^9$ is an aromatic or substituted aromatic group. In still other embodiments, $R^9$ is a heteroaromatic or substituted heteroaromatic group.

Examples of aldehydes include, but are not limited to, formaldehyde, acetaldehyde, propanal, butanal, pentanal, hexanal, heptanal, octanal, nonanal, decanal, dodecanal, cyclohexanecarboxaldehyde, cycloheptanecarboxaldehyde, cyclooctanecarboxaldehyde, cyclodecanecarboxaldehyde, cyclododecanecarboxaldehyde, benzaldehyde, 2-methoxybenzaldehyde, 4-diethylaminobenzaldehyde, trans-cinnamaldehyde, and mixtures thereof.

In particular embodiments, the aldehyde is a benzaldehyde or substituted benzaldehyde, which may be represented by the formula:

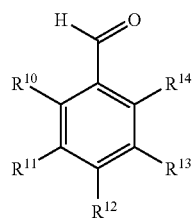

where $R^{10}$, $R^{11}$, $R^{12}$, $R^{13}$, and $R^{14}$ are each independently a hydrogen atom or a monovalent organic group, or where two or more of $R^{10}$, $R^{11}$, $R^{12}$, $R^{13}$, and $R^{14}$ join to form a divalent organic group.

In one or more embodiments, divalent organic groups may include hydrocarbylene groups or substituted hydrocarbylene groups such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. The divalent organic groups may also contain one or more heteroatoms such as, but not limited to, nitrogen, oxygen, boron, silicon, sulfur, and phosphorus atoms.

Examples of substituted benzaldehydes include, but are not limited to, 4-ethylbenzaldehyde, 4-isobutylbenzaldehyde, 4-fluoro-3-methylbenzaldehyde, 3-methylbenzaldehyde, 4-propylbenzaldehyde, 4-butylbenzaldehyde, 4-methoxybenzaldehyde, 3-chlorobenzaldehyde, 3,4-dimethylbenzaldehyde, 3,5-difluorobenzaldehyde, 3-fluorobenzaldehyde, 4-fluorobenzaldehyde, 3-bromo-4-fluorobenzaldehyde, 3-methyl-4-methoxybenzaldehyde, 2,4,5-trimethylbenzaldehyde, 4-chloro-3-fluorobenzaldehyde, 4-methylbenzaldehyde, 3-bromobenzaldehyde, 4-methoxybenzaldehyde, 3,4-dichlorobenzaldehyde, 4-fluoro-3,5-dimethylbenzaldehyde, 2,4-dimethylbenzaldehyde, 4-bromobenzaldehyde, 3-ethoxybenzaldehyde, 4-allyloxybenzaldehyde, 3,5-dimethylbenzaldehyde, 4-chlorobenzaldehyde, 3-methoxybenzaldehyde, 4-(trifluoromethyl)benzaldehyde, 2-naphthaldehyde, 4-isopropylbenzaldehyde, 3,4-diethoxybenzaldehyde, 3-bromo-4-ethoxybenzaldehyde, piperonal, 3,4-dimethoxybenzaldehyde, 4-carboxybenzaldehyde, 3-hex-1-ynylbenzaldehyde, and 2-chlorobenzaldehyde.

In one or more embodiments, ketones include compounds represented by the formula $R^9$—C(O)—$R^{15}$, where $R^{15}$ and $R^9$ are each independently a monovalent organic group, or where $R^{15}$ and $R^9$ join to form a divalent organic group. In particular embodiments, at least one of $R^{15}$ and $R^9$ is an acyclic hydrocarbyl or substituted hydrocarbyl group having at least three carbon atoms, in other embodiments at least six carbon atoms, and in other embodiments at least nine carbon atoms up to 20 carbon atoms, where the term substituted refers to the replacement of one or more hydrogen atoms that are attached to a carbon atom with a monovalent organic group. In other embodiments, at least one of $R^{15}$ and $R^9$ is a cyclic hydrocarbyl or substituted cyclic hydrocarbyl group including six carbon atoms, in other embodiments at least eight carbon atoms, and in other embodiments at least 10 carbon atoms in the ring. In certain embodiments, at least one of $R^{15}$ and $R^9$ is a heterocyclic or substituted heterocyclic group. In yet other embodiments, at least one of $R^{15}$ and $R^9$ is an aromatic or substituted aromatic group. In still other embodiments, at least one of $R^{15}$ and $R^9$ is a heteroaromatic or substituted heteroaromatic group.

Examples of ketones include, but are not limited to, acetone, propanone, 2-butanone, 2-pentanone, 3-pentanone, 2-hexanone, 3-hexanone, 2-heptanone, 4-heptanone, 2-octanone, 4-octanone, 2-nonanone, 3-nonanone, 5-nonanone, 2-decanone, 5-decanone, acetophenone, benzophenone, 4,4'-bis(diethylamino)benzophenone, cyclobutanone, cyclohexanone, cycloheptanone, cyclooctanone, cyclododecanone, and mixtures thereof.

In one or more embodiments, acetals or ketals of alditols may be defined by the formula:

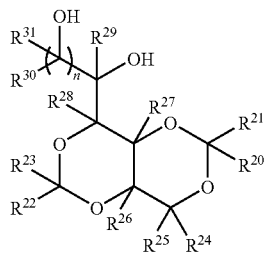

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2. In particular embodiments, $R^{20}$ and $R^{22}$ are monovalent organic group and $R^{21}$ and $R^{23}$ are hydrogen atoms. In these or other embodiments, $R^{25}$ is a monovalent organic group and $R^{24}$, $R^{26}$, $R^{27}$, $R^{28}$, $R^{29}$, $R^{30}$, and $R^{31}$ are hydrogen atoms.

In one or more embodiments, $R^{20}$ and $R^{22}$ are aromatic groups, and particular embodiments may be defined by the formula:

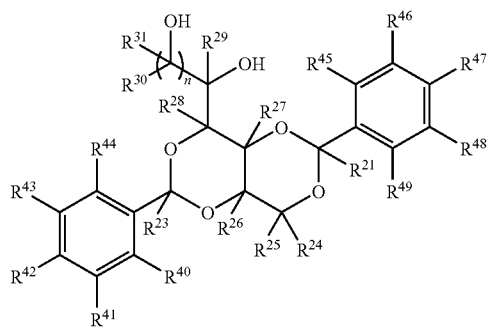

where $R^{21}$, $R^{23}$, $R^{24}$, $R^{25}$, $R^{26}$, $R^{27}$, $R^{28}$, $R^{29}$, $R^{30}$ $R^{31}$, $R^{40}$, $R^{41}$, $R^{42}$, $R^{43}$, $R^{44}$, $R^{45}$, $R^{46}$, $R^{47}$, $R^{48}$ and $R^{49}$ are each independently a hydrogen atom or a monovalent organic group, or where two or more of $R^{40}$, $R^{41}$, $R^{42}$, $R^{43}$, $R^{44}$, $R^{45}$, $R^{46}$, $R^{47}$, $R^{48}$ and $R^{49}$ join to form a divalent organic group, and where n is 0, 1, or 2.

In one or more embodiments, examples of acetals of alditols include dimethylidene sorbitol, dibenzylidene sorbitol (DBS), di(alkylbenzylidene)sorbitols, 1,3-O-2,4-bis(3,4-dimethylbenzylidene)sorbitol, 1,3,2,4-bis(4-ethylbenzylidene)-1-allyl-sorbitol, 1,3,2,4-bis(3'-methyl-4'-fluorobenzylidene)-1-propyl-sorbitol, 1,3,2,4-bis(5',6',7',8'-tetrahydro-2-naphthaldehydebenzylidene)-1-allyl-xylitol, bis-1,3,2-4-(3',4'-dimethylbenzylidene)-1"-methyl-2"-propyl-sorbitol, and 1,3,2,4-bis(3',4'-dimethylbenzylidene)-1-propyl-xylitol.

In one or more embodiments, the polymers that are introduced with the acetals or ketals of alditols according to this invention include those polymers exhibiting low resistance to cold flow and therefore present technological difficulties during storage and transport.

In one or more embodiments, these polymers may be characterized by a disadvantageous cold flow as determined by employing standard ASTM cold flow measurements or derivatives thereof. These tests are well known to those skilled in the art. For example, gravitational cold flow may generally be determined according to the following method, which may be referred to as a standard test. A sample of the polymer to be tested is formed into a cylindrical shape having a diameter of about 10 mm and a height of about 13 mm. The cylinder is placed on one of its circular bases and left in place for 28 days; after which time the height of the cylinder is measured. Alternatively, these samples can be placed under a weight to simulate the force that would be excerpted on the polymer under the weight of additional bales of rubber that may be stacked on top of a bottom bale.

In other embodiments, similar tests can be performed in an accelerated manner using a Scott Tester. This may be determined by the following method, which may be referred to as an accelerated test. A 40 mm×13 mm cylinder can be placed on one of its cylindrical bases and a weight, such as a 5000 gram mass, can be placed on top of the cylinder for 30 minutes; after which time the height of the cylinder is measure.

In one or more embodiments, polymers that may be advantageously treated according to one or more embodiments of this invention include those polymers that are characterized by a cold flow, prior to treatment according to this invention, indicated by sample height of less than 7 mm, in other embodiments less than 6 mm, in other embodiments less than 5 mm, in other embodiments less than 4 mm, and in other embodiments less than 3 mm after a 13 mm cylindrical sample of the polymer is subjected to the standard cold test (i.e. gravitational cold flow analysis) for 28 days at room temperature.

In these or other embodiments, polymers that may be advantageously treated according to one or more embodiments of this invention include those polymers that are characterized by a cold flow, prior to treatment according to this invention, indicated by sample height of less than 7 mm, in other embodiments less than 6 mm, in other embodiments less than 5 mm, in other embodiments less than 4 mm, and in other embodiments less than 3 mm after a 13 mm cylindrical samples of the polymers is subjected to the accelerated cold flow test (i.e. accelerated gravitational cold flow analysis using a Scott Tester).

In one or more embodiments, the polymers that are introduced with the acetals or ketals of alditols according to this invention include elastomers, which are polymers that are capable of being vulcanized to form vulcanizates exhibiting elastomeric properties. In one or more embodiments, the elastomers are unsaturated. In one or more embodiments, the elastomers have a glass transitions temperature (Tg) of less than 20° C., in other embodiments less than 10° C., in other embodiments less than 0° C., in other embodiments less than −10° C., in other embodiments less than −20° C., and in other embodiments less than −30° C.

In one or more embodiments, the polymers that are introduced with the acetals or ketals of alditols according to this invention include linear molecules. In other embodiments, the polymers are substantially linear or only include limited branching.

In one or more embodiments, the polymers that are introduced with the acetals or ketals of alditols according to this invention include natural and/or synthetic elastomers. In one or more embodiments, elastomers include polymers that are capable of being crosslinked or vulcanized to form cured compounds (also known as vulcanizates) that exhibit elastomeric properties. The synthetic elastomers may derive from the polymerization of conjugated diene monomers. These conjugated diene monomers may be copolymerized with other monomers such as vinyl aromatic monomers. In one or more embodiments, conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. In one or more embodiments, vinyl aromatic monomer includes styrene, α-methylstyrene, vinyl toluene, vinyl naphthalene, p-butyl styrene and t-butyl styrene. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star shaped.

In one or more embodiments, useful elastomers may have a number average molecular weight (Mn) of less than 500 kg/mol, in other embodiments less than 400 kg/mol, in other embodiments less than 300 kg/mol, in other embodiments less than 250 kg/mol, in other embodiments less than 200 kg/mol, in other embodiments less than 150 kg/mol, and in other embodiments less than 125 kg/mol. In these or other embodiments, the elastomers may have a number average molecular weight of at least 25 kg/mol, in other embodiments at least 50 kg/mol, in other embodiments at least 75 kg/mol, in other embodiments at least 100 kg/mol. In these or other embodiments, the molecular weight distribution of the elastomers (Mn/Mw) is less than 5.5, in other embodiments less than 4.5, in other embodiments less than 4.0, in other embodiments less than 3.5, in other embodiments less than 2.5, and in other embodiments less than 2.0. As is known in the art, Mn (number average molecular weight) and Mw (weight average molecular weight) may be determined by using gel permeation chromatography (GPC) calibrated with polystyrene standards and adjusted for the Mark-Houwink constants for the polymer in question.

In one or more embodiments, the elastomer is a homopolymer, and in other embodiments the elastomer is a copolymer, which refers to a polymer having two or more chemically distinct polymerization units, which may be referred to as mer units. In one or more embodiments, the mer units of the polymer may be cis, trans, or vinyl.

In particular embodiments, the elastomers are polydienes having a cis-1,4-linkage content that is greater than about 60%, in other embodiments greater than about 75%, in other embodiments greater than about 90%, and in other embodiments greater than about 95%. Also, these elastomers may have a 1,2-linkage content (i.e. vinyl content) that is less than about 7%, in other embodiments less than 5%, in other embodiments less than 2%, and in other embodiments less than 1%. The cis-1,4- and 1,2-linkage contents can be determined by infrared spectroscopy. The number average molecular weight ($M_n$) of these polydienes may be from about 25,000 to about 200,000, in other embodiments from about 30,000 to about 150,000, and in other embodiments from about 50,000 to about 120,000, as determined by using gel permeation chromatography (GPC) calibrated with polystyrene standards and Mark-Houwink constants for the polymer in question. The polydispersity of these polydienes may be from about 1.5 to about 5.0, and in other embodiments from about 2.0 to about 4.0. Exemplary high cis-polydienes include cis-1,4-polybutadiene, cis-1,4-polyisoprene, and cis-1,4-poly(butadiene-co-isoprene).

In one or more embodiments, the elastomers include a medium or low cis polydiene (or polydiene copolymer) including those prepared by anionic polymerization techniques. These elastomers can have a cis content of from about 10% to about 70%, in other embodiments from about 15% to about 60%, and in other embodiments from about 20% to about 50%, where the percentages are based upon the number of diene mer units in the cis configuration versus the total number of diene mer units. These elastomers may also have a 1,2-linkage content (i.e., vinyl content) from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the elastomers include a random copolymer of butadiene, styrene, and optionally isoprene. In other embodiments, the elastomer is a block copolymer of polybutadiene, polystyrene, and optionally polyisoprene. In particular embodiments, the elastomer is hydrogenated or partially hydrogenated.

In one or more embodiments, the elastomers include anionically-polymerized polymer selected from the group consisting of polybutadiene, functionalized polyisoprene, functionalized poly(styrene-co-butadiene), functionalized poly(styrene-co-butadiene-co-isoprene), functionalized poly(isoprene-co-styrene), and functionalized poly(butadiene-co-isoprene). The number average molecular weight ($M_n$) of these polymers may be from about 25,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity of these polymers may be from about 1.0 to about 3.0, and in other embodiments from about 1.1 to about 2.0.

In one or more embodiments, the synthetic elastomers may include functionalized elastomers. In one or more embodiments, functionalized elastomers include at least one functional group. In one or more embodiments, a functional group is a group or substituent that is distinct from main portion of the polymer chain. In particular embodiments, the functional group includes a heteroatom. In certain embodiments, the functional group may be reactive or interactive with other polymer chains (propagating and/or non-propagating) or with other constituents that may be combined with the polymer such as reinforcing fillers (e.g., carbon black). In particular embodiments, functional groups include those groups attached to the polymer chain and reduce the 50° C. hysteresis loss of a carbon-black filled vulcanizate prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, the functionalized elastomers include a functional group located at the end of the polymer chain. In particular embodiments, the functional group may be located at the head of the polymer, which is the end of the polymer where initiation or polymerization of the polymer began. In other embodiments, the functional group may be located at the tail of the polymer, which is the end of the polymer where the polymerization thereof is terminated. In particular embodiments, the functionalized elastomer includes both head and tail functionalization; that is, the polymer includes at least one functional group located at the head of the polymer chain and at least one functional group located at the tail of the polymer chain.

Useful techniques for preparing functionalized elastomers are well known in the art. For example, these functional groups can be added to the polymer during synthesis of the elastomer or by grafting to the elastomer.

In one embodiment, the elastomers are synthesized by using anionic polymerization techniques. As is known in the art, an initiator including a functional group can be employed to produce polymers having a functional group located at the head of the polymer chain. For example, initiators that include cyclic amine groups, which impart a cyclic amine functionality to the resulting polymers. An example of these initiators includes lithio hexamethyleneimine, which is disclosed in U.S. Pat. Nos. 6,080,835; 5,786,441; 6,025,450; and 6,046,288, which are incorporated herein by reference. In another embodiment, the elastomers are synthesized by using anionic polymerization initiators that include at least one tin atom. These compounds, such as tin-lithium initiators, are believed to incorporate a tin atom at the head of the polymer chain. An example includes tributyltin lithium, which is disclosed in U.S. Pat. No. 5,268,439, which is incorporated herein by reference. In yet another embodiment, initiators that are dithioacetals can be employed to incorporate a heterocyclic group at the head of the polymer chain as disclosed in and U.S. Pat. No. 7,153,919 and U.S. Publication Nos. 2006/0264590, and 2006/0264589, which are incorporated herein by reference. Still others are disclosed in U.S. Pat. No. 7,335,712, which is incorporated herein by reference.

In yet another embodiment, anionically-polymerized elastomers, whether head-functionalized or not, are terminated with a coupling agent or a terminating agent that will impart an end functionality to the tail of the polymer. Useful compounds that may be used to couple or functionalize the tail end of the living polymers include, but are not limited to, those compounds that can be defined by the formula $R_nMX_{4-n}$, where R is an organic group, M is silicon or tin, X is a halogen atom, and n is a numeral from 0 to 3. Preferably, R is a simple alkyl group having from 1 to about 10 carbon atoms. Exemplary compounds include $SnCl_4$, $R_2SnCl_2$, and $RSnCl_3$, which are disclosed in U.S. Pat. No. 5,332,810, which is incorporated herein by reference. Other compounds that may be used alone or in conjunction with the foregoing tin or silicon compounds include metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides.

In still another embodiment, elastomers synthesized with coordination catalyst systems, such as lanthanide-based catalyst systems, are terminated with a coupling agent or terminating agent that will impart an end functionality to the polymer. Useful coupling or functionalizing agents include those described above, which are described in International Application Nos. PCT/US00/30743 and PCT/US00/30875, which are incorporated herein by reference. In one or more embodiments, suitable functionalizing agents include those compounds that may contain groups such as ketone, aldehyde, amide, ester, imidazolidinone, isocyanate, and isothiocyanate groups. Examples of these compounds are disclosed in U.S. Publication Nos. 2006/0004131 A1, 2006/0025539 A1, 2006/0030677 A1, and 2004/0147694 A1, which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference. Still others are disclosed in U.S. Pat. Nos. 4,906,706, 4,990,573, 5,064,910, 5,567,784, and 5,844,050, 6,992,147, 6,977,281; U.S. Publication No. 2006/0004131A1; Japanese Patent Application Nos. 05-051406A, 05-059103A, 10-306113A, and 11-035633A, which are incorporated herein by reference. Useful functionalizing agents that can be used to couple reactive polymer chains, which compounds may also be referred to as coupling agents, include any of those known in the art including, but not limited to, metal halides such as tin tetrachloride, metalloid halides such as silicon tetrachloride, ester carboxylate metal complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

In one or more embodiments, the acetals or ketals of alditols are introduced to the polymer to be treated within a polymeric cement. In one or more embodiments, the polymeric cement includes a solvent and the polymer. In preparing the polymer cements, the solvent may include a polar solvent, a nonpolar solvent, or mixture thereof. In one or more embodiments, the polar organic solvent is non-protic. An example of a useful non-protic, polar organic solvent is tetrahydrofuran (THF). Suitable types of nonpolar organic solvents include, but are not limited to, aliphatic, cycloaliphatic, and aromatic hydrocarbons. Some representative examples of these solvents include n-pentane, n-hexane, n-heptane, n-octane, n-nonane, n-decane, isopentane, isohexane, isoheptane, isooctane, 2,2-dimethyl butane, petroleum ether, kerosene, petroleum spirits, and isomers thereof. Some representative examples of suitable cycloaliphatic solvents include cyclopentane, cyclohexane, methylcyclopentane, methyl cyclohexane, and the like. Some representative examples of suitable aromatic solvents include benzene, pyridine, toluene, xylene, ethyl benzene, diethyl benzene, mesitylene, and mixtures of aliphatic, cycloaliphatic and aromatic compounds. Commercial mixtures of the above hydrocarbons, such as hexanes, may also be used.

The polymer cement may be prepared by using several techniques. In one embodiment, the cement is prepared by synthesizing elastomers within an organic solvent. In another embodiment, the cement is prepared by dissolving or suspending the elastomers within an organic solvent. In one or more embodiments, the elastomer is prepared in a non-polar solvent and the polar solvent is subsequently added to the solution of elastomer within the non-polar solvent.

In one or more embodiments, the rubbery elastomers can be synthesized by well-known techniques, and practice of this invention is not limited by the process used to prepare the polymer.

In any event, the polymer cement to which the acetals or ketals of alditols is added may range in polymer concentration. In one or more embodiments, the polymer cement may include at least 10% by weight, in other embodiments at least 15% by weight, in other embodiments at least 20% by weight, and in other embodiments at least 25% by weight polymer based on the entire weight of the cement. In these or other embodiments, the polymer cement includes less than 60% by weight, in other embodiments less than 55% by weight, in other embodiments less than 50% by weight, in other embodiments less than 45% by weight, and in other embodiments less than 40% by weight polymer based on the entire weight of the cement.

In one or more embodiments, the acetals or ketals of alditols are added directly to the polymer cement. In other embodiments, the acetals or ketals of alditols are premixed with other compounds or solvents and added to the polymer cement as a premix, which may also be referred to as a masterbatch.

In one or more embodiments, the premix or masterbatch is formed by introducing the acetals or ketals of alditols with a solvent in which the low molecular weight compound is soluble. For example, DBS may be introduced with and dissolved within THF to form a premix, which may also be referred to as a masterbatch solution. To this premix may be added other constituents such as oils and/or compatibilizers.

In one or more embodiments, the acetals or ketals of alditols may be added to the polymer cement while the polymer cement in undergoing mixing or agitation, and this mixing or agitation may continue after introduction of the acetals or ketals of alditols.

In one or more embodiments, the introduction of the acetals or ketals of alditols may take place under atmospheric pressure. In other embodiments, the introduction of the acetals or ketals of alditols may take place under pressure in excess of 1.5 atm, in other embodiments in excess of 2.0 atm, and in other embodiments in excess of 3.0 atm, and in other embodiments between 1 and 4 atm. In these or other embodiments, the introduction may take place while the cement is at a temperature of from about 30 to about 130° C., in other embodiments from about 40 to about 120° C., and in other embodiments from about 50 to about 100° C. In one or more embodiments, the cement is maintained within these temperature ranges during the addition process, and optionally during mixing or agitation.

In one or more embodiments, the amount of acetals or ketals of alditols added to the polymer cement may be at least 0.5 parts by weight (pbw), in other embodiments at least 1.0 pbw, in other embodiments at least 1.5 pbw, and in other embodiments at least 2.0 pbw per 100 parts by weight of the polymer (phr). In these or other embodiments, the amount of acetals or ketals of alditols added to the polymer cement may be less than 5.0 pbw, in other embodiments less than 4.5 pbw, and in other embodiments less than 4.0 pbw phr.

In one or more embodiments, after introduction of the acetals or ketals of alditols to the cement, the polymer and at least a portion of the acetals or ketals of alditols are isolated, or substantially isolated, from the solvent. In particular embodiments, the isolated product is further dried. Conventional procedures for desolventization and drying may be employed. In one embodiment, the polymer and acetals or ketals of alditols may be isolated from the solvent by steam desolventization. Residual water may be removed by oven drying. Alternatively, solvent may be removed by using conventional drying techniques such as a drum dryer. Alternatively, the solvent can be removed by evaporation.

The polymer product produced by one or more embodiments of the present invention may be characterized by an advantageous cold flow resistance. This advantageous cold flow resistance may be represented at least a 10% increase, in other embodiments at least a 20% increase, in other embodiments at least a 30% increase, in other embodiments at least a 40% increase, in other embodiments at least a 80% increase, and in other embodiments at least a 100% increase, and in other embodiments at least a 500% increase, and in other embodiments at least a 1000% increase in gravitational cold flow as compared to similar polymeric compositions that do not include the acetals or ketals of alditols, where the cold flow resistance is determined using the gravitational analysis described above The polymer product produced by one or more embodiments of the present invention may be characterized by an advantageous cold flow resistance. This advantageous cold flow resistance may be represented at least a 10% increase, in other embodiments at least a 20% increase, in other embodiments at least a 30% increase, in other embodiments at least a 40% increase, in other embodiments at least a 80% increase, and in other embodiments at least a 100% increase, and in other embodiments at least a 200% increase, and in other embodiments at least a 300% increase in gravitational cold flow as compared to similar polymeric compositions that do not include the acetals or ketals of alditols, where the accelerated cold flow resistance is determined using the Scott tester and analysis described above.

In one or more embodiments, the polymeric compositions produced according to the present invention may be employed to prepare vulcanizable compositions. In preparing the vulcanizable compositions of matter, the polymer may be combined with other ingredients such as fillers and like, which are well known in the art of rubber compounding.

The rubber compositions may include fillers such as inorganic and organic fillers. The organic fillers include carbon black. The inorganic fillers may include silica, aluminum hydroxide, magnesium hydroxide, clays (hydrated aluminum silicates), and mixtures thereof.

A multitude of rubber curing agents may be employed. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365-468, particularly VULCANIZATION AGENTS AND AUXILIARY MATERIALS pp. 390-402, or Vulcanization by A. Y. Coran, ENCYCLOPEDIA OF POLYMER SCIENCE AND ENGINEERING, $2^{nd}$ Edition, John Wiley & Sons, Inc., 1989, which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

Fillers are typically employed in an amount from about 1 to about 100 phr, and preferably from about 20 to about 90 phr, and more preferably from about 35 to about 80 phr, where phr refers to parts by weight ingredient per 100 parts by weight rubber within the compound, which may include the rubber within the premix as well as any additional rubber that may be added during compounding.

The vulcanizable rubber composition may be prepared by forming an initial masterbatch that includes the premix and filler. This initial masterbatch may be mixed at a starting temperature of from about 25° C. to about 100° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in the in *The Compounding and Vulcanization of Rubber*, by Stevens in RUBBER TECHNOLOGY SECOND EDITION (1973 Van Nostrand Reinhold Company). The mixing conditions and procedures applicable to silica-filled tire formulations are also well known as described in U.S. Pat. Nos. 5,227,425; 5,719,207; 5,717,022, as well as EP 0890606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 170° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Tire components of this invention preferably include tire treads. The rubber compositions, however, can also be used to form other elastomeric tire components such as subtreads, sidewalls, body ply skims, bead fillers and the like. Pneumatic tires can be made as discussed in U.S. Pat. Nos. 5,866,171; 5,876,527; 5,931,211; and 5,971,046, which are incorporated herein by reference.

The vulcanizable rubber compositions prepared according to this invention may also be employed in the manufacture of other rubber articles. For example, they may be employed in the manufacture of rubber air springs, which are vibration damping devices that are typically employed in trucks. They may also be employed in manufacture of rubber sheeting and other articles that are employed in preparing roofing materials. They may also be used in the manufacture of hoses.

In another embodiment, compounds known as organic gelators can be used to improve the cold flow characteristics of elastomers without deleteriously impacting the properties or use of the elastomers. These polymeric compositions advantageously demonstrate similar cure characteristics, similar Mooney viscosities, and comparable dynamic properties to those compositions that are similarly prepared but do not include the organic gelator. As is known in the art, organic gelators include those compounds that alter the liquid nature of organic solvents and form gelatins via various chemical and physical interactions either with each other and/or together with the organic solvent. In particular embodiments, it is believed that certain organic gelators interact to form a network or domain within the elastomer that is treated with the organic gelator. These networks may be self-assembled networks, and may be discrete, continuous, or semi-continuous. In particular embodiments, these networks are believed to be formed by hydrogen bonding or via pi stacking of certain substituents on the compounds.

Practice of this embodiment is not necessarily limited by the use of the organic gelators. Therefore, the elastomers that are treated with the organic gelators include those same polymers that exhibit low resistance to cold flow, and therefore present technological difficulties during storage and transport, as described with respect to the previous embodiments. Likewise, the methods for introducing the organic gelator to the elastomer may be similar to those described with respect to the previous embodiments. For example, the organic gelators may be added to a polymer cement including the elastomer, and the elastomer together with the organic gelator can be isolated from the solvent. Also, similar amounts of organic gelator can be employed. For example, the amount of organic gelator added to the polymer cement may be at least 0.5 parts by weight (pbw), in other embodiments at least 1.0 pbw, in other embodiments at least 1.5 pbw, and in other embodiments at least 2.0 pbw per 100 parts by weight of the polymer (phr). In these or other embodiments, the amount of organic gelator added to the polymer cement may be less than 5.0 pbw, in other embodiments less than 4.5 pbw, and in other embodiments less than 4.0 pbw phr. These polymeric compositions that demonstrate improved cold flow may advantageously be employed in the manufacture of tires as described above with respect to the first embodiment.

In order to demonstrate the practice of the present invention, the following examples have been prepared and tested. The examples should not, however, be viewed as limiting the scope of the invention. The claims will serve to define the invention.

EXAMPLES

Samples 1-3

Polymer cements including 18% by weight styrene-butadiene copolymer rubber (SBR) in THF were prepared. The SBR was prepared by anionic polymerization techniques employing n-butyl lithium initiator and isopropanol (IPA) as a terminator, thereby yielding unfunctionalized SBR. GPC analysis of the SBR indicated an Mn of 88 kg/mol and an Mn/Mw of less than 1.1.

To the polymer cement was optionally added dibenzylidene sorbitol (DBS) in amounts shown in Table 1. The SBR was then isolated and subjected to frequency and temperature sweeps using a rheometer. The frequency sweep (2% strain) data showed an increase in the dynamic viscosity of the SBRs containing 1.5 and 3 weight percent DBS indicating an improvement in cold flow resistance as shown in FIG. 1. Temperature sweep on the same samples indicated an increase in the flow temperature (G"≧G') of the SBR containing DBS. Subjecting the polymers to RPA stress relaxation experiments where the strain is 100% did not show improvement in cold flow resistance of the DBS-containing SBR (FIG. 2). This data indicates that the cold flow resistance of DBS-containing polymers is strain dependent. Table 1 also shows the flow temperature, which was the temperature at which G' equaled G".

TABLE 1

Composition and Microstructure of Polymers Prepared for Temperature Sweep, Frequency Sweep, and RPA Experiments.

| Sample | 1 | 2 | 3 |
|---|---|---|---|
| Sample Terminator | IPA | IPA | IPA |
| Mn (kg/mol) | 88 | 88 | 88 |
| Mn/Mw | 1.1 | 1.1 | 1.1 |
| DBS (phr) | 0 | 1.5 | 3 |
| % 1,2 | 38.1 | 38.1 | 38.1 |
| % 1,2 (butadiene = 100) | 49.4 | 49.4 | 49.4 |
| % 1,4 | 39.2 | 39.2 | 39.2 |
| % styrene (total) | 22.4 | 22.4 | 22.4 |
| Flow Temperature (G' = G", ° C.) | 80 | 85 | 105 |

All polymers have Mn of 88 kg/mol and Mn/Mw ≦ 1.1.

Samples 4-13

Ten additional polymer cements were prepared employing procedures similar to those employed for samples 1-3. The polymers were anionically polymerized using n-butyl lithium as an initiator and terminated with various terminators as provided in Table 2. In particular, three polymers were terminated with IPA, three samples were terminated with 2-(methylthio)-2-thiazoline (thiazoline), and three samples were terminated with N,N-dimethylimidazolidinone (DMI). As with samples 1-3, 18% polymer solutions in THF were prepared and DBS was added in amounts provided in Table 2.

TABLE 2

Composition and Microstructure of Polymers Prepared for Compounding Evaluation and Cold Flow Experiments. All polymers have Mn of 110 kg/mol and Mn/Mw ≦ 1.1.

| | Samples | | | | | | | | |
|---|---|---|---|---|---|---|---|---|---|
| | 4 | 5 | 6 | 7 | 8 | 9 | 10 | 11 | 12 |
| Sample Terminator | IPA | IPA | IPA | thiazoline | thiazoline | thiazoline | DMI | DMI | DMI |
| wt % DBS | 0 | 1.5 | 3 | 0 | 1.5 | 3 | 0 | 1.5 | 3 |
| % 1,2 | 46.1 | 46.1 | 46.1 | 45.5 | 45.5 | 45.5 | 45.7 | 45.7 | 45.7 |
| % 1,2 (butadiene = 100) | 57.2 | 57.2 | 57.2 | 56.5 | 56.5 | 56.5 | 56.8 | 56.8 | 56.8 |
| % 1,4 | 34.4 | 34.4 | 34.4 | 35.0 | 35.0 | 35.0 | 34.7 | 34.7 | 34.7 |
| % styrene (total) | 19.5 | 19.5 | 19.5 | 19.4 | 19.4 | 19.4 | 19.5 | 19.5 | 19.5 |
| % styrene (block) | 1.8 | 1.8 | 1.8 | 1.5 | 1.5 | 1.5 | 1.7 | 1.7 | 1.7 |

IPA = isopropanol;
thiazoline = 2-(methylthio)-2-thiazoline;
DMI = N,N-dimethylimidazolidinone After the optional addition of the DBS, the polymer was isolated by evaporating the solvent, and testing was conducted. Each polymer sample had its cold flow resistance measured using a Scott tester. In this experiment, each polymer sample (15.5 grams) was melt pressed in an Instron compression mold using a Carver Press at 100° C. for 20 minutes. After cooling, the samples were removed from the press as cylinder shapes with a diameter and height of uniform thickness of 40.0 mm×13.0 mm, respectively. The Scott tester used a weight (5000 grams) to press the samples for 30 minutes at which time the polymer sample thickness was measured.

As seen from the data in Table 3, the addition of DBS to any of the polymers resulted in an improvement in cold flow when compared to polymers that did not contain DBS. SBRs that are chain end functionalized with thiazoline or DMI show slightly better cold flow resistance than unfunctionalized polymers.

The polymer samples were also subjected to gravitational cold flow measurements. In this experiment, each polymer sample (2.5 grams) was melt pressed in an Instron compression mold using a Carver Press at 100° C. for 20 minutes. After cooling, the samples were removed from the press as cylinder shapes with a diameter and height of uniform thickness of 13.0 mm. The gravitational cold flow test used a 11.4 g weight, which was used to simulate the weight of a stack of six bales of polymer to compress each sample for 28 days at room temperature. This test, similar to the Scott tester, revealed that functionalized and unfunctionalized polymers have superior improved cold flow resistance when compared to polymers that do not contain DBS.

TABLE 3

Cold Flow Resistance Results for the Polymers Prepared in Table 2.

| | Samples | | | | | | | | |
|---|---|---|---|---|---|---|---|---|---|
| | 4 | 5 | 6 | 7 | 8 | 9 | 10 | 11 | 12 |
| Sample Terminator | IPA | IPA | IPA | thiazoline | thiazoline | thiazoline | DMI | DMI | DMI |
| wt % DBS | 0 | 1.5 | 3 | 0 | 1.5 | 3 | 0 | 1.5 | 3 |
| Scott Tester (3 min; mm) | 5.1 | 9.2 | 11.1 | 8.6 | 10.5 | 11.3 | 7.6 | 10.5 | 11.3 |
| Gravitational Cold Flow (28 days; mm) | 1.6 | 9.9 | 11.1 | 2.4 | 12.0 | 11.9 | 2.3 | 8.6 | 11.2 |

IPA = isopropanol;
thiazoline = 2-(methylthio)-2-thiazoline;
DMI = N,N-dimethylimidazolidinone Compounds 4-13

The polymers prepared and optionally treated with DBS in samples 4-13 were employed to make carbon black-filled rubber formulations similar to those conventionally employed for making tire treads. The recipe for the rubber formulations is set forth in Table 4.

TABLE 4

Carbon Black Formulation used for Compounding Polymers in Table 2.

| | phr |
|---|---|
| Master Batch | |
| Polymer | 100 |
| Carbon Black (N343) | 50 |
| Stearic Acid | 2 |
| Wax Blend | 2 |
| Antioxidant | 0.95 |
| Final Batch | |
| Master Batch | 164.95 |
| Sulfur and Accelerators | 1.5 |
| Zinc Oxide | 2.5 |

The rubber formulations were sheeted and cured according to conventional techniques. The Mooney viscosity ($ML_{1+4}$) of the uncured compound was determined at 130° C. by using a Alpha Technologies Mooney viscometer with a large rotor, a one-minute warm-up time, and a four-minute running time. The tensile at break ($T_b$), and the elongation at break ($E_b$) were determined according to ASTM D412. The Payne effect data ($\Delta G'$) and hysteresis data (tan δ) of the vulcanizates were obtained from a dynamic strain sweep experiment, which was conducted at 50° C. and 15 Hz with strain sweeping from 0.1% to 14.25%. $\Delta G'$ is the difference between G' at 0.1% strain and G' at 14.25% strain. The physical properties of the vulcanizates are summarized in Table 5.

TABLE 5

Comparison of Compounding Results for Unfunctionalized and Functionalized SBRs Containing DBS.

| | Samples | | | | | | | | |
|---|---|---|---|---|---|---|---|---|---|
| | 4 | 5 | 6 | 7 | 8 | 9 | 10 | 11 | 12 |
| Sample Terminator | IPA | IPA | IPA | thiazoline | thiazoline | thiazoline | DMI | DMI | DMI |
| wt % DBS | 0 | 1.5 | 3 | 0 | 1.5 | 3 | 0 | 1.5 | 3 |
| $ML_{1+4}$ @ 100° C. | 35.6 | 37.8 | 40.6 | 52.3 | 55 | 56.9 | 55.3 | 60.4 | 60.7 |
| 50% Modulus @ 23° C. (MPa) | 1.71 | 1.86 | 1.93 | 1.61 | 1.75 | 1.83 | 1.52 | 1.71 | 1.74 |
| 300% Modulus @ 23° C. (MPa) | 12.08 | 13.07 | 13.26 | 15.32 | 16.20 | 16.10 | 16.35 | 17.54 | 17.3 |
| Tensile Break Stress @ 23° C. (MPa) | 18 | 15.5 | 17.5 | 19.7 | 21.2 | 18.17 | 19.85 | 20.53 | 20 |
| Elongation at Break @ 23° C. (%) | 415 | 344 | 380 | 363 | 372 | 329 | 347 | 339 | 336 |
| 50% Modulus @ 100° C. (MPa) | 1.32 | 1.41 | 1.4 | 1.34 | 1.43 | 1.43 | 1.27 | 1.28 | 1.39 |
| 200% Modulus @ 100° C. (MPa) | 6.03 | 6.57 | 6.67 | 7.24 | 7.83 | 8.00 | 7.74 | 8.04 | 8.22 |
| Tensile Break Stress @ 100° C. (MPa) | 7.87 | 7.4 | 7.27 | 9.01 | 9.3 | 9.3 | 8.4 | 8.53 | 8.7 |
| Elongation at Break @ 100° C. (%) | 247 | 220 | 215 | 234 | 227 | 222 | 212 | 209 | 218 |
| tanδ [TS; 0° C.; 10 Hz, 2%] | 0.451 | 0.422 | 0.442 | 0.486 | 0.458 | 0.527 | 0.513 | 0.465 | 0.509 |
| G'(MPa) [TS; 0° C.; 10 Hz, 2%] | 18.5 | 22.9 | 25 | 13.6 | 17.2 | 15.2 | 11.1 | 14.3 | 14.5 |
| tanδ [TS; 30° C.; 10 Hz, 2%] | 0.253 | 0.252 | 0.273 | 0.211 | 0.221 | 0.163 | 0.188 | 0.189 | 0.209 |
| G'(MPa) [TS; 30° C.; 10 Hz, 2%] | 8.75 | 11 | 11.5 | 6.48 | 8.21 | 6.69 | 5.34 | 6.98 | 6.67 |
| tanδ [TS; 60° C.; 10 Hz, 2%] | 0.227 | 0.233 | 0.241 | 0.168 | 0.183 | 0.118 | 0.143 | 0.148 | 0.158 |
| G'(MPa) [TS; 60° C.; 10 Hz, 2%] | 5.95 | 7.53 | 7.5 | 4.57 | 5.78 | 4.68 | 3.84 | 5.03 | 4.56 |
| tanδ [Dynastat; 0° C.; 10 Hz] | 0.379 | 0.316 | 0.337 | 0.524 | 0.446 | 0.469 | 0.500 | 0.432 | 0.499 |
| tanδ [Dynastat; 30° C.; 10 Hz] | 0.252 | 0.252 | 0.264 | 0.179 | 0.199 | 0.204 | 0.148 | 0.163 | 0.170 |
| tanδ [Dynastat; 60° C.; 10 Hz] | 0.219 | 0.236 | 0.229 | 0.136 | 0.155 | 0.151 | 0.112 | 0.105 | 0.125 |
| G'(MPa) [SS; 60° C.; 10 Hz, 5%] | 2.86 | 3.29 | 3.03 | 2.11 | 2.45 | 2.39 | 1.91 | 2.37 | 2.15 |
| tanδ [SS; 60° C.; 10 Hz, 5%] | 0.244 | 0.258 | 0.253 | 0.148 | 0.159 | 0.158 | 0.117 | 0.126 | 0.128 |
| $\Delta G'$(MPa) [SS; 60° C.; 10 Hz, 0.25%-14.25%] | 3.87 | 5.28 | 4.54 | 0.93 | 1.52 | 1.41 | 0.47 | 0.98 | 0.75 |

It can be seen that the addition of DBS to SBR does not alter the vulcanizate properties. The compound Mooney viscosities and cure rheometer data suggest similar processing abilities between the DBS-containing samples and the coupled Sample 13. Likewise, elongation at break and modulus data are also similar to Sample 13. As can be seen from the data in Table 5, functionalized SBRs containing DBS have similar hysteresis and G' values at 0, 30, and 60° C. as the coupled polymer of Sample 13. DBS addition does not appear to impact the interaction between the functional end group and carbon black.

Various modifications and alterations that do not depart from the scope and spirit of this invention will become apparent to those skilled in the art. This invention is not to be duly limited to the illustrative embodiments set forth herein.

What is claimed is:

1. A method for preparing a polymeric composition, the method comprising:
   i.) providing a polymer cement including a polymer and a solvent;
   ii.) introducing an acetal or ketal of an alditol with the polymer cement; and
   iii.) isolating at least a portion of the polymer and the acetal or ketal of an alditol from the solvent to provide a polymeric composition including the polymer and the acetal or ketal of an alditol.

2. The method of claim 1, where the polymer includes a polydiene or a polydiene copolymer.

3. The method of claim 2, where the polydiene is polybutadiene having a cis-1,4 content of at least 90%.

4. The method of claim 2, where the polydiene copolymer includes polymerization units deriving from a diene and a vinyl aromatic.

5. The method of claim 4, where the diene is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene, and where the vinyl aromatic is selected from the group consisting of styrene, α-methylstyrene, vinyl toluene, vinyl naphthalene, p-butyl styrene and t-butyl styrene.

6. The method of claim 2, where the polymer cement includes from about 10 to about 40% by weight of the polymer.

7. The method of claim 1, where said step of introducing includes introducing at least 0.5 part by weight of the acetal of an alditol and less than 4.5 parts by weight acetal of an alditol per 100 parts by weight polymer.

8. The method of claim 2, where said step of introducing introduces an acetal of an alditol with the polymer cement.

9. The method of claim 8, where the acetal of an alditol is the reaction product of an aldehyde and an alditol or a substituted alditol.

10. The method of claim 9, where the alditol is defined by the formula:

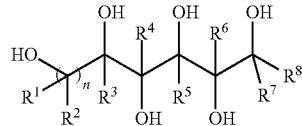

where $R^1$, $R^2$, $R^3$, $R^4$, $R^5$, $R^6$, $R^7$ and $R^8$ are each independently a hydrogen atom or monovalent organic group, and n is 0, 1, or 2.

11. The method of claim 10, where the alditol is selected from the group consisting of sorbitol, xylitol, allyl-sorbitol, propyl-sorbitol, 1-methyl-2-propenyl sorbitol, allyl-xylitol, and propyl-xylitol.

12. The method of claim 9, where the aldehyde is selected from the group consisting of formaldehyde, acetaldehyde, propanal, butanal, pentanol, hexanal, heptanal, octanal, nonanal, decanal, dodecanal, cyclohexanecarboxaldehyde, cyclohepptanecarboxaldehyde, cyclooctanecarboxaldehyde, cyclodecanecarboxaldehyde, cyclododecanecarboxaldehyde, benzaldehyde, 2-methoxybenzaldehyde, 4-diethylaminobenzaldehyde, trans-cinnamaldehyde, and mixtures thereof.

13. The method of claim 9, where the aldehyde is benzaldehyde or substituted benzaldehyde represented by the formula:

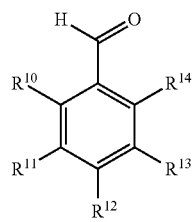

where $R^{10}$, $R^{11}$, $R^{12}$, $R^{13}$, and $R^{14}$ are each independently a hydrogen atom or a monovalent organic group, or where two or more of $R^{10}$, $R^{11}$, $R^{12}$, $R^{13}$, and $R^{14}$ join to form a divalent organic group.

14. The method of claim 1, where the acetal or ketal of an alditol is represented by the formula:

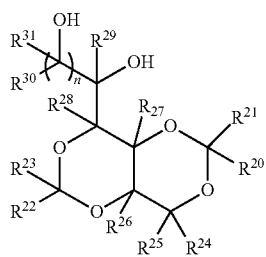

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2.

15. The method of claim 14, where the acetal or ketal of an alditol is an acetal of an alditol defined by the formula:

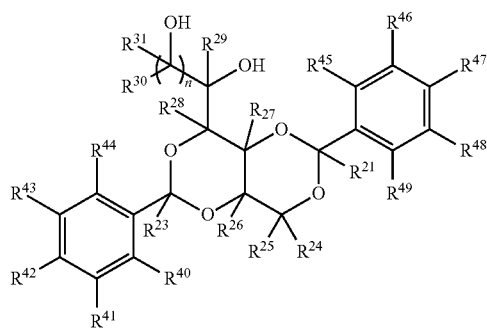

where $R^{21}$ and $R^{23}$ are hydrogen, and where $R^{24}$, $R^{25}$, $R^{26}$, $R^{27}$, $R^{28}$, $R^{29}$, $R^{30}$ $R^{31}$, $R^{40}$, $R^{41}$, $R^{42}$, $R^{43}$, $R^{44}$, $R^{45}$, $R^{46}$, $R^{47}$, $R^{48}$ and $R^{49}$ are each independently a hydrogen atom or a monovalent organic group, or where two or more of $R^{40}$, $R^{41}$, $R^{42}$, $R^{43}$, $R^{44}$, $R^{45}$, $R^{46}$, $R^{47}$, $R^{48}$ and $R^{49}$ join to form a divalent organic group, and where n is 0, 1, or 2.

16. The method of claim 15, where the acetal of an alditol is selected from the group consisting of dibenzylidene sorbitol (DBS), di(alkylbenzylidene) sorbitols, 1,3-O-2,4-bis(3,4-dimethylbenzylidene)sorbitol, 1,3,2,4-bis(4-ethylbenzylidene)-1-allyl-sorbitol, 1,3,2,4-bis(3'-methyl-4'-fluorobenzylidene)-1-propyl-sorbitol, 1,3,2,4-bis(5',6',7',8'-tetrahydro-2-naphthaldehydebenzylidene)-1-allyl-xylitol, bis-1,3,2-4-(3',4'-dimethylbenzylidene)-1''-methyl-2''-propyl-sorbitol, and 1,3,2,4-bis(3',4'-dimethylbenzylidene)-1-propyl-xylitol.

17. The method of claim 16, where the acetal of an alditol is dibenzylidene sorbitol.

18. The method of claim 16, where the acetal of an alditol is di(alkylbenzylidene)sorbitol.

19. The method of claim 1, where said step of introducing an acetal or ketal of an alditol with the polymer cement including introducing at least 0.5 parts by weight and less than 5.0 parts by weight of the acetal or ketal of an alditol with 100 parts by weight of polymer in the polymer cement.

20. A method for preparing a polymeric composition, the method comprising:
   i) providing a polymer cement; and
   ii) introducing dibenzylidene sorbitol to the polymer cement.

21. The method of claim 20, where said step of providing includes polymerizing monomer within a solvent to produce the polymer cement.

22. The method of claim 21, where said step of polymerizing monomer includes anionically polymerizing monomer.

23. The method of claim 21, where said step of polymerizing monomer employs a coordination catalyst system.

24. The method of claim 21, where the monomer includes conjugated diene monomer.

25. The method of claim 24, where the monomer further includes vinyl aromatic monomer.

26. The method of claim 20, where the polymer cement includes a polar solvent.

27. The method of claim 20, where the polymer cement includes a nonpolar solvent.

28. The method of claim 27, where the nonpolar solvent includes aliphatic solvent.

29. The method of claim 20, where the dibenzylidene sorbitol is introduced to a polar solvent prior to said step of introducing the dibenzylidene sorbitol to the polymer cement.

30. A polymeric composition comprising:
   i.) a functionalized elastomer, where the functionalized elastomer includes a functional group that reduces the 50° C. hysteresis loss of a carbon black filled vulcanizate prepared from the functionalized polymer as compared to similar carbon-black filled vulcanizates prepared from non-functionalized polymer; and
   ii.) an acetal or ketal of an alditol, where the acetal or ketal of an alditol is dispersed within said elastomer.

31. A vulcanizate prepared from the polymeric composition of claim 30.

32. A tire component prepared from the polymeric composition of claim 30.

33. The polymeric composition of claim 30, further comprising filler and optionally oil.

34. The vulcanizate of claim 31, where the vulcanizate includes crosslinks deriving from sulfur or peroxide.

35. The composition of claim 30, where the acetal or ketal of an alditol is defined by the formula:

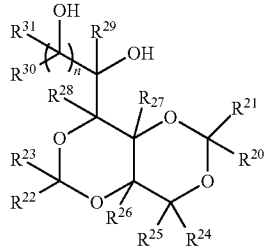

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2.

36. The composition of claim 30, where the acetal or ketal of an alditol is dibenzylidene sorbitol.

37. A polymeric composition comprising:
   i.) a vulcanizable elastomer selected from the group consisting of polydienes and polydiene copolymers; and
   ii.) at least about 0.5 parts by weight of an acetal or ketal of an alditol per 100 parts by weight elastomer, where the acetal or ketal of an alditol is dispersed within said elastomer, where the acetal or ketal of an alditol increases the cold flow resistance of the vulcanizable elastomer by at least 10%.

38. The composition of claim 37, where the polydiene or polydiene copolymer have a cis-1,4-linkage content that is greater than 90%.

39. The composition of claim 37, where the polydiene or polydiene copolymer have a cis-1,4-linkage content of from about 10% to about 70%, and a 1,2-linkage content of from about 10% to about 60%, with the balance including trans-1,4-linkage content.

40. The composition of claim 37, where the polydiene or polydiene copolymer exhibits cold flow prior to the combination with the combination or reaction product of (i) an acetal or ketal of an alditol, and where the cold flow is quantified by a change from 13 mm to less than 7 mm in the height of a cylindrical sample after standard cold flow analysis.

41. The composition of claim 37, where the polydiene or polydiene copolymer have a glass transition temperature of less than 0° C.

42. The method of claim 20, where the polymer cement includes at least 10% by weight polymer.

43. The composition of claim 20, where said step of introducing includes adding a masterbatch to the polymer cement, where the masterbatch includes the acetal or ketal of an alditol dissolved within a solvent.

44. The method of claim 30, where the elastomer is a polydiene or polydiene copolymer.

45. The method of claim 37, where the acetal or ketal of an alditol is dispersed within said elastomer by introducing the acetal or ketal or an alditol to the elastomer while the elastomer is dissolved in a solvent.

46. The method of claim 37, where the polymeric composition consists essentially of the vulcanizable elastomer, and the acetal or ketal of an alditol.

47. The method of claim 37, where the vulcanizable elastomer is functionalized.

48. The method of claim 47, where the vulcanizable elastomer includes at least one functional group located at a terminus of the elastomer, and where the functional group reduces the 50° C. hysteresis loss of a carbon black filled vulcanizate prepared from the functionalized polymer as compared to similar carbon-black filled vulcanizates prepared from non-functionalized polymer.

49. The method of claim 30, where the functional group is located at a terminus of the polymer.

50. The method of claim 29, where the polar solvent includes THF.

\* \* \* \* \*